United States Patent
Murase et al.

(10) Patent No.: US 7,934,063 B2
(45) Date of Patent: Apr. 26, 2011

(54) INVOKING EXTERNALLY ASSISTED CALLS FROM AN ISOLATED ENVIRONMENT

(75) Inventors: Masana Murase, Kawasaki (JP);
Wilfred E. Plouffe, Jr., San Jose, CA (US); Masaharu Sakamoto, Yokohama (JP); Kanna Shimizu, Austin, TX (US); Vladimir Zbarsky, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 810 days.

(21) Appl. No.: 11/693,406

(22) Filed: Mar. 29, 2007

(65) Prior Publication Data
US 2008/0244612 A1    Oct. 2, 2008

(51) Int. Cl.
*G06F 13/28* (2006.01)
(52) U.S. Cl. .................................................. 711/154
(58) Field of Classification Search .................. 711/154, 711/168; 714/9–13, 30, 51, 48, 52, 53; 718/106, 718/1
See application file for complete search history.

(56) References Cited

U.S. PATENT DOCUMENTS

| | | | |
|---|---|---|---|
| 4,683,549 | A | 7/1987 | Takaki |
| 5,142,683 | A | 8/1992 | Burkhardt et al. |
| 5,146,593 | A | 9/1992 | Brandle et al. |
| 5,463,735 | A | 10/1995 | Pascucci et al. |
| 5,615,263 | A | 3/1997 | Takahashi |
| 5,630,059 | A | 5/1997 | Brady et al. |
| 5,708,830 | A | 1/1998 | Stein |
| 5,901,309 | A | 5/1999 | Hammer et al. |
| 6,032,186 | A | 2/2000 | Hernandez et al. |
| 6,032,244 | A | 2/2000 | Moudgill |
| 6,124,868 | A | 9/2000 | Asaro et al. |
| 6,230,284 | B1 | 5/2001 | Lillevold |
| 6,233,613 | B1 | 5/2001 | Walker et al. |
| 6,308,223 | B1 | 10/2001 | Opgenoorth |
| 6,321,323 | B1 | 11/2001 | Nugroho et al. |

(Continued)

FOREIGN PATENT DOCUMENTS
CA        1233258       2/1988
(Continued)

OTHER PUBLICATIONS

Eng, David, Notice of Allowance dated Aug. 11, 2008; U.S. Appl. No. 11/269,290.

(Continued)

*Primary Examiner* — Man Phan
*Assistant Examiner* — Nourali Mansoury
(74) *Attorney, Agent, or Firm* — Dillon & Yudell LLP

(57) ABSTRACT

A method of invoking power processor element (PPE) serviced C library functions on a synergistic processing element (SPE) running in isolated mode. When the SPE initiates a PPE-serviced function, an SPE stub routine allocates a parameter buffer in an open area of a local store (LS) memory within the SPE. The LS memory includes an open area accessible to the PPE, and an isolated area inaccessible to the PPE. The SPE stub routine copies function parameters corresponding to the PPE-serviced function to a buffer within the open area of the LS memory, and writes a message word, which contains an identification variable of the PPE-serviced function and a location variable of the function parameters, to the open area. When execution is temporarily suspended on the SPE, the PPE reads the message word from the open area of the LS memory and executes the PPE-serviced function.

19 Claims, 3 Drawing Sheets

U.S. PATENT DOCUMENTS

| | | |
|---|---|---|
| 6,424,627 B1 | 7/2002 | Sorhaug et al. |
| 6,633,564 B1 | 10/2003 | Steer et al. |
| 6,662,297 B1 | 12/2003 | Boom et al. |
| 6,704,863 B1 | 3/2004 | Paul et al. |
| 6,738,850 B2 | 5/2004 | Lai et al. |
| 6,754,223 B1 | 6/2004 | Lussier et al. |
| 6,782,445 B1 | 8/2004 | Olgiati et al. |
| 6,804,239 B1 | 10/2004 | Lussier et al. |
| 6,895,460 B2 | 5/2005 | Desoli et al. |
| 6,938,132 B1 | 8/2005 | Joffe et al. |
| 7,016,968 B2 | 3/2006 | Willner et al. |
| 7,076,558 B1 | 7/2006 | Dunn |
| 7,203,758 B2 | 4/2007 | Cook et al. |
| 7,210,022 B2 | 4/2007 | Jungck et al. |
| 7,213,137 B2 | 5/2007 | Boom et al |
| 7,278,014 B2 | 10/2007 | Erb |
| 7,281,120 B2 | 10/2007 | Dieffenderfer et al. |
| 7,290,050 B1 | 10/2007 | Smith et al. |
| 7,318,144 B2 | 1/2008 | Najam et al. |
| 7,346,898 B2 | 3/2008 | Tserng |
| 7,383,424 B1 | 6/2008 | Olgiati et al. |
| 7,472,261 B2 | 12/2008 | Brokenshire et al. |
| 2005/0251667 A1* | 11/2005 | Iwamoto .................. 712/233 |
| 2007/0074206 A1* | 3/2007 | Iwamoto ..................... 718/1 |
| 2007/0074221 A1* | 3/2007 | Stenson et al. ............. 718/106 |
| 2007/0143551 A1* | 6/2007 | Marr et al. .................. 711/154 |
| 2008/0244200 A1* | 10/2008 | Day et al. ................... 711/156 |
| 2008/0244612 A1 | 10/2008 | Murase et al. |

FOREIGN PATENT DOCUMENTS

| | | |
|---|---|---|
| EP | 0174231 A1 | 3/1986 |
| EP | 0387172 A2 | 9/1990 |
| JP | 02-272627 | 11/1990 |

OTHER PUBLICATIONS

Kahle, J.A., "Introduction to the Cell multiprocessor," IBM Corporation, IBM Journal of Research and Development, vol. 49, No. 4-5, Jul./Sep. 2005, pp. 589-604.

Eng, David—Office Action dated Sep. 22, 2009, U.S. Appl. No. 12/128,927.

Eng, David—Office Action dated Apr. 2, 2010, U.S. Appl. No. 12/128,927.

Eng, David—Final Rejection dated Sep. 9, 2010, U.S. Appl. No. 12/128,927.

"Synergistic Processor Unit Instruction Set Architecture, Version 1.0," IBM Corporation, Aug. 1, 2005; www.128.ibm.com/developerworks/power/cell/, pp. 1-257.

"Cell Broadband Engine Architecture, Version 1.0," IBM Corporation, Aug. 8, 2005; www.128.ibm.com/developerworks/power/cell/, pp. 1-319.

\* cited by examiner

INVOKING EXTERNALLY ASSISTED CALLS FROM AN ISOLATED ENVIRONMENT

CROSS-REFERENCE TO RELATED APPLICATIONS

The present application is related to the following U.S. patent application Ser. No. 11/269,290, entitled "Apparatus and Method for Performing Externally Assisted Calls In A Heterogeneous Processing Complex", filed on Nov. 8, 2005, owned by the assignee hereof, and which is hereby incorporated herein by reference in its entirety.

BACKGROUND OF THE INVENTION

1. Technical Field

The present invention relates in general to the data processing systems and in particular to microprocessors. Still more particularly, the present invention relates to an improved method, system, and computer program product for invoking processor-serviced functions on a synergistic processing element (SPE) running in isolated mode.

2. Description of the Related Art

In conventional cell broadband engine architecture (also referred to as cell processors), a processor typically includes four main components: external input/output (I/O) structures; a main processor referred to as the power processing element (PPE); a number of fully-functional co-processors referred to as synergistic processing elements (SPEs); and a high-bandwidth circular data bus referred to as the element interconnect bus (EIB). Cell processors couple a PPE to multiple SPEs via the EIB, thereby increasing system performance while providing access to both a main memory and external data storage devices. The PPE thus acts as a controller for the SPEs, which handle most of the computational workload, and the PPE starts, stops, interrupts, and/or schedules processes executed by the SPEs.

Cell processors include multiple modes of operation (e.g., isolated mode and non-isolated mode) that permit access to different levels of memory for processes executed by the SPEs or the PPE. Conventional SPEs each contain a small local store (LS) memory area, which is visible to the PPE and can be directly accessed by different processes/applications. However, the LS does not operate like a conventional CPU cache, since the LS is not transparent to software and does not include hardware structures capable of predicting which data to load. Similarly, an SPE can not directly access system memory. Although system memory addresses for both the PPE and SPE are typically expressed as 64-bit values, LS addresses internal to the SPE are typically expressed as 32-bit words.

Conventional methods for invoking PPE-serviced functions from an SPE C language library are based on the assumption that the PPE will have fall read/write access to the LS of the SPE (i.e., when the SPE is executing in non-isolated mode). However, when an SPE is executing in isolated mode, the majority of the LS is not accessible to other processors, with the exception of a small open area. Consequently, an improved method for invoking PPE-serviced functions on a SPE running in isolated mode is needed.

SUMMARY OF A CLAIMED EMBODIMENT

Disclosed are a method, system, and computer program product for invoking power processor element (PPE) serviced C library functions on a synergistic processing element (SPE) running in isolated mode. When the SPE initiates a PPE-serviced function, an SPE stub routine allocates a parameter buffer in an open area of a local store (LS) memory within the SPE. The LS memory includes an open area, which is accessible to the PPE, and an isolated area, which is inaccessible to the PPE. The SPE stub routine copies function parameters that correspond to the PPE-serviced function to a buffer within the open area of the LS memory, and writes a message word, which contains an identification variable of the PPE-serviced function and a location variable of the function parameters, to the open area. When execution is temporarily suspended on the SPE, the PPE reads the message word from the open area of the LS memory and executes the PPE-serviced function. The SPE subsequently resumes execution of the temporarily suspended process.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
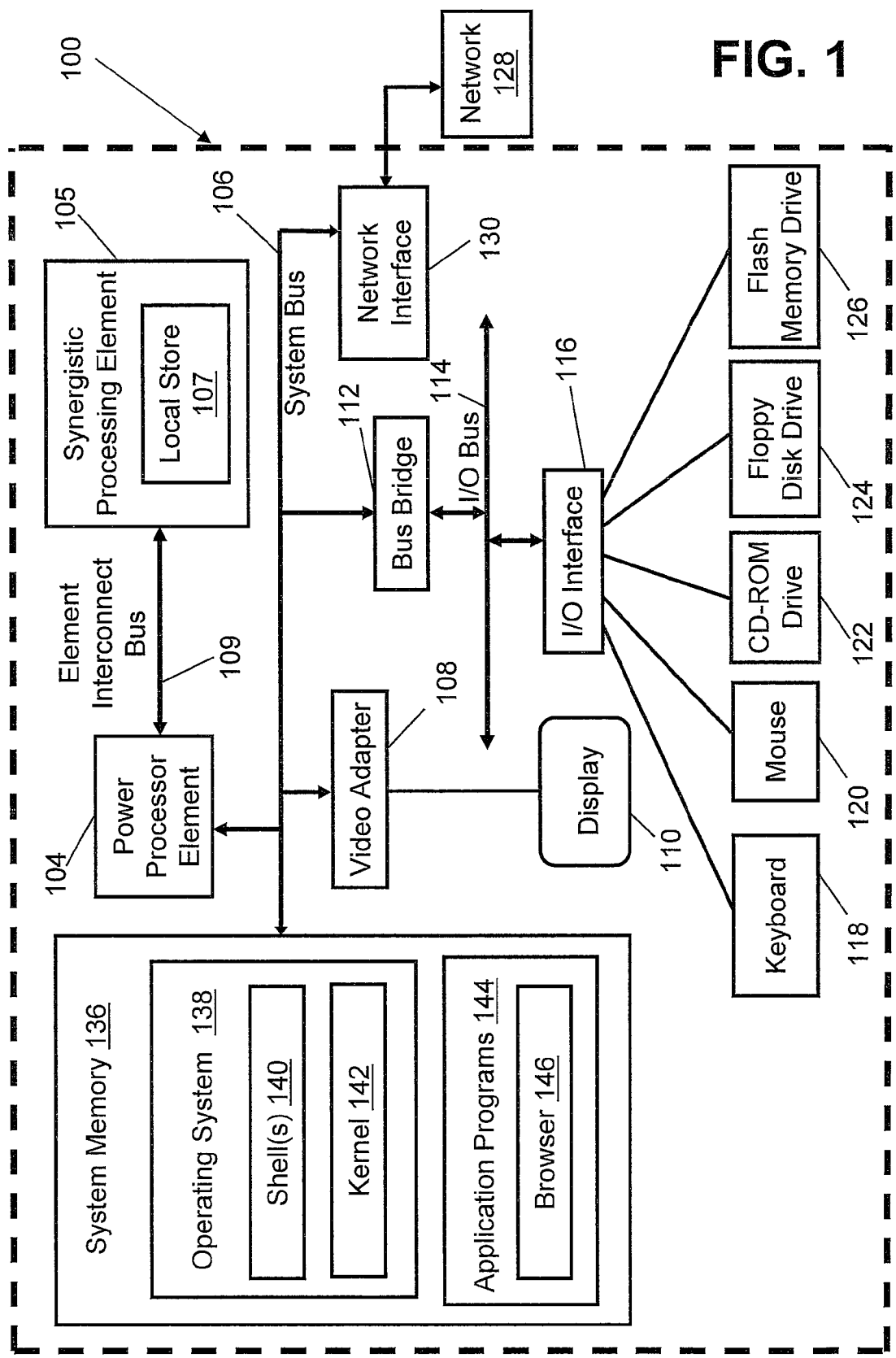
FIG. 1 depicts a high level block diagram of an exemplary data processing system, according to an embodiment of the present invention.

With reference now to FIG. 1, there is depicted a block diagram of an exemplary computer 100, with which the present invention may be utilized. Computer 100 includes a power processor element (PPE) 104 that is coupled to a system bus 106. PPE 104 is also coupled to one or more synergistic processing elements (SPEs) 105, which each include a local store (LS) 107, via an element interconnect bus (EIB) 109. A video adapter 108, which drives/supports a display 110, is also coupled to system bus 106. System bus 106 is coupled via a bus bridge 112 to an Input/Output (I/O) bus 114. I/O interface 116 is coupled to I/O bus 114. I/O interface 116 affords communication with various I/O devices, including a keyboard 118, a mouse 120, a Compact Disk—Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

A system memory 136 is coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

Computer 100 is able to communicate with a network 128 using a network interface 130, which is coupled to system bus 106. Network 128 may be an external network such as the Internet, or an internal network such as an Ethernet or a Virtual Private Network (VPN). Application programs 144 include a browser 146. Browser 146 includes program modules and instructions enabling a World Wide Web (WWW) client (i.e., computer 100) to send and receive network messages to the Internet.

OS 138 includes a shell 140, for providing transparent user access to resources such as application programs 144. Generally, shell 140 (as it is called in UNIX®) is a program that provides an interpreter and an interface between the user and the operating system. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
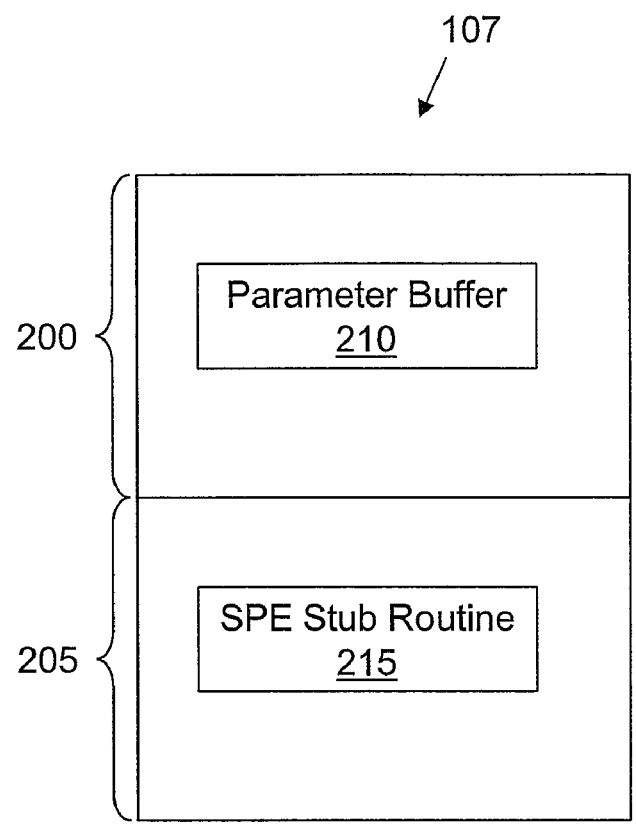
FIG. 2 illustrates a high level block diagram of a local store (LS) within a synergistic processing element (SPE), according to an embodiment of the present invention.

With reference now to FIG. 2, there is depicted a high level block diagram of LS 107 (from FIG. 1) within SPE 105, according to an embodiment of the present invention. LS 107 includes an open area 200 and an isolated area 205. Open area 200 includes a parameter buffer 210. SPE stub routine 215, which is stored in isolated area 205, allocates space within parameter buffer 210 for each PPE-serviced function that SPE 105 executes. Similarly, SPE stub routine 215 stores data corresponding to the function parameter in open area 200. The processes performed by SPE stub routine 215 are illustrated in FIG. 3, which is discussed below.

Figure 3:
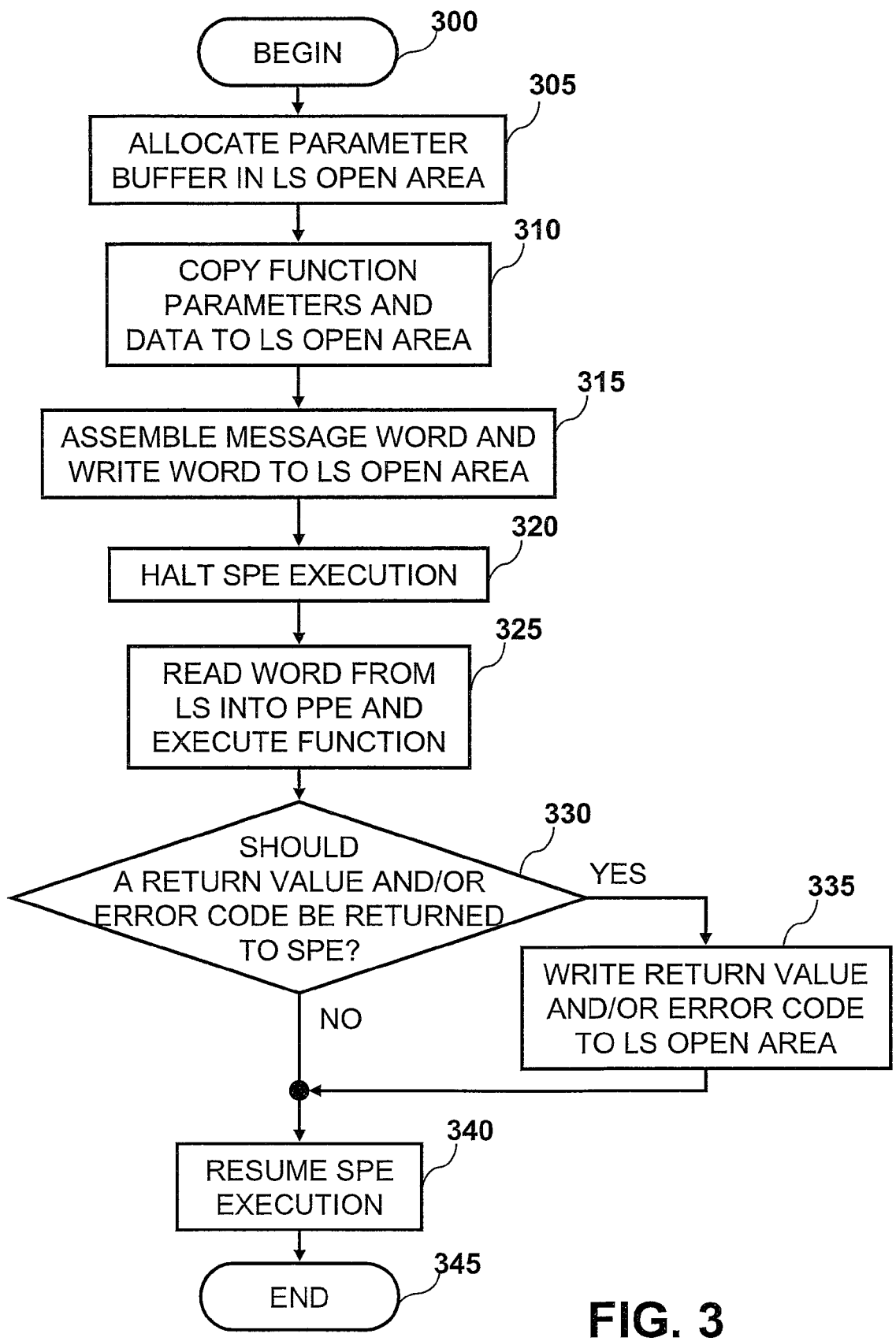
FIG. 3 is a high level logical flowchart of an exemplary method by which a SPE executes a PPE-serviced function, according to an embodiment of the invention.

Turning now to FIG. 3, there is illustrated a high level logical flowchart of an exemplary method of SPE 105 (from FIG. 1) executing a PPE-serviced function, according to an embodiment of the invention. The process begins at block 300 in response to SPE 105 initiating a PPE-serviced function. SPE stub routine 215 (from FIG. 2) allocates space within parameter buffer 210 for data associated with the PPE-serviced function, as depicted in block 305. SPE stub routine 215 copies function parameters into parameter buffer 210, and SPE stub routine 215 also copies data pointed to by the function parameters into open area 200 of LS 107, as shown in block 310. According to the illustrative embodiment, when SPE stub routine 215 copies multiple data entries into open area 200 of LS 107, SPE stub routine 215 copies each data entry such that the individual entries do not overlap (i.e., overwrite each other) within open area 200 of LS 107.

SPE stub routine 215 assembles a message word and writes the message word to a message slot within open area 200 of LS 107, as depicted in block 315. As utilized herein, a message word refers to a variable containing identification information (e.g., an 8 bit "syscall" code) that corresponds to the PPE-serviced function and address information (e.g., a 24 bit LS address) that corresponds to the location of the function parameters in parameter buffer 210. Similarly, a message slot refers to a portion of open area 200 of LS 107 reserved for one or more message word data entries.

SPE stub routine 215 stops the execution of a current process on SPE 105, and SPE stub routine 215 signals PPE 104 to initiate execution of the PPE-serviced function, as depicted in block 320. In response to receipt of the initiation signal, PPE 104 reads the message word that corresponds to the PPE-serviced function from the message slot within open area 200 of LS 107, parses the location of the function parameters from the message word, and executes the PPE-serviced function identified by the message word, as shown in block 325.

At block 330, PPE 104 determines whether the execution of the PPE-serviced function requires that PPE 104 provide a return value and/or an error code to the caller of the PPE-serviced function (i.e., SPE 105). For example, if the PPE-serviced function does not execute completely, an error code that signifies an incomplete execution is returned to the caller. Similarly, if the PPE-serviced function provides a confirmation upon successful execution (e.g., a "handshake"), a return value is provided to the caller.

If the PPE-serviced function requires that PPE 104 provide a return value and/or an error code to SPE 105, PPE 104 writes the return value and/or error code to open area 200 of LS 107, as depicted in block 335, and the process proceeds to block 340, which is discussed below. If the PPE-serviced function does not require that PPE 104 provide a return value and/or an error code to the caller of the PPE-serviced function (i.e., SPE 105), SPE 105 resumes execution of the process that was halted at block 320, as shown in block 340, and the process subsequently concludes at block 345.

The present invention thus enables SPE 105 (of FIG. 1) to execute PPE-serviced functions when SPE 105 is running in isolated mode. When SPE 105 initiates a PPE-serviced function, SPE stub routine 215 (of FIG. 2) allocates parameter buffer 210 in open area 200 of LS 107 within SPE 105. LS 107 includes open area 200, which is accessible to PPE 104, and isolated area 205, which is inaccessible to PPE 104. SPE stub routine 215 copies function parameters that correspond to the PPE-serviced function to parameter buffer 210 within open area 200 of LS 107, and writes a message word, which contains an identification variable corresponding to the PPE-serviced function and a location variable pointing to the function parameters, to open area 200. When execution is temporarily suspended on SPE 105, PPE 104 reads the message word from open area 200 of LS 107 and executes the PPE-serviced function. SPE 105 subsequently resumes execution of the temporarily suspended process.

It is understood that the use herein of specific names are for example only and not meant to imply any limitations on the invention. The invention may thus be implemented with different nomenclature/terminology and associated functionality utilized to describe the above devices/utility, etc., without limitation.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a computer system including a cell processor having a first hardware processing element configured to service a particular function and a second hardware processing element, a method comprising:
   in response to said second hardware processing element of the cell processor initiating said particular function:
      allocating a parameter buffer in an open area of a local store (LS) memory within said second hardware processing element, wherein said LS memory comprises said open area accessible to said first hardware processing element and an isolated area inaccessible to said first hardware processing element;
      copying function parameters of said particular function to the parameter buffer within said open area of said LS memory;
      writing a message word to said open area of said LS memory, wherein said message word comprises an identification variable of said particular function and a location variable of said function parameters within said open area of said LS memory; and
      suspending execution of a current process on the second hardware processing element;
   while execution of the current process is suspended on said second hardware processing element of the cell processor, the first hardware processing element of the cell processor:
      reading said message word from the open area of the LS memory of the second hardware processing element into said first hardware processing element;
      executing said particular function identified by said message word within said first hardware processing element; and
   in response to completion of execution of the particular function by the first hardware processing element, the second hardware processing element resuming execution of said current process previously suspended on said second hardware processing element.

2. The method of claim 1, wherein the copying the function parameters of said particular function to said parameter buffer within said open area of said LS memory is performed by a stub routine located within said isolated area of said LS memory.

3. The method of claim 1, wherein the writing said message word to said open area of said LS memory is performed by a stub routine located within said isolated area of said LS memory.

4. The method of claim 1, and further comprising returning a confirmation value to said second hardware processing element from said first hardware processing element when execution of said particular function is completed.

5. The method of claim 1, and further comprising returning an error code to said second hardware processing element from said first hardware processing element when execution of said particular function is inhibited.

6. A cell processor comprising:
   a first hardware processing element configured to service a particular function;
   a second hardware processing element coupled to said first hardware processing element, wherein said second hardware processing element includes a local store (LS) memory containing an open area accessible to said first hardware processing element and an isolated area inaccessible to said first hardware processing element, wherein said second hardware processing element, responsive to initiation of a particular function, allocates a parameter buffer in the open area of said LS memory, copies function parameters of said particular function to the parameter buffer within said open area, writes to said open area a message word including an identification variable of said particular function and a location variable of said function parameters within said open area, and suspends execution of its current process;
   wherein, while execution of the current process is suspended on said second hardware processing element, said first hardware processing element reads said message word from the LS memory of the second hardware processing element and executes said particular function identified by said message word; and
   wherein said second hardware processing element thereafter resumes execution of said current process previously suspended on said second hardware processing element in response to completion of execution of the particular function by the first hardware processing element.

7. The cell processor of claim 6, and further comprising a stub routine located within said isolated area of said LS memory that copies the function parameters of said particular function to said parameter buffer within said open area of said LS memory.

8. The cell processor of claim 6, and further comprising a stub routine located within said isolated area of said LS memory that writes said message word to said open area of said LS memory.

9. The cell processor of claim 6, wherein said first hardware processing element returns to said second hardware processing element a confirmation value to said second hardware processing element when execution of said particular function is completed.

10. The cell processor of claim 6, wherein said first hardware processing element returns to said second hardware processing element an error code to said second hardware processing element from said first hardware processing element when execution of said particular function is inhibited.

11. A computer program product comprising:
   a non-transitory, tangible computer readable storage medium; and
   program code on said computer readable storage medium that when executed provides the functions of:
      in response to a second hardware processing element of a cell processor initiating a particular function serviced by a first hardware processing element of the cell processor:
      allocating a parameter buffer in an open area of a local store (LS) memory within said second hardware processing element, wherein said LS memory comprises said open area accessible to said first hardware processing element and an isolated area inaccessible to said first hardware processing element;
      copying function parameters of said particular function to the parameter buffer within said open area of said LS memory;
      writing a message word to said open area of said LS memory, wherein said message word comprises an identification variable of said particular function and a location variable of said function parameters within said open area of said LS memory; and
      suspending execution of a current process on the second hardware processing element;
   while execution of the current process is suspended on said second hardware processing element of the cell processor, the first hardware processing element:
      reading said message word into said first hardware processing element;

executing said particular function identified by said message word within said first hardware processing element; and in response to completion of execution of the particular function by the first hardware processing element, the second hardware processing element resuming execution of said current process previously suspended on said second hardware processing element.

12. The computer program product of claim 11, wherein the copying the function parameters of said particular function to said parameter buffer within said open area of said LS memory is performed by a stub routine located within said isolated area of said LS memory.

13. The computer program product of claim 11, wherein the writing said message word to said open area of said LS memory is performed by a stub routine located within said isolated area of said LS memory.

14. The computer program product of claim 11, wherein the resuming execution of said current process previously suspended on said second hardware processing element further comprises returning a confirmation value to said second hardware processing element from said first hardware processing element when execution of said particular function is completed.

15. The computer program product of claim 11, wherein resuming execution of said current process previously suspended on said second hardware processing element further comprises returning an error code to said second hardware processing element from said first hardware processing element when execution of said particular function is inhibited.

16. The method of claim 3, and further comprising the stub routine within said isolated area of said LS memory suspending execution of the current process on the second hardware processing element.

17. The computer system of claim 8, wherein the stub routine within said isolated area of said LS memory suspends execution of the current process on the second hardware processing element.

18. The computer program product of claim 13, wherein the stub routine within said isolated area of said LS memory suspends execution of the current process on the second hardware processing element.

19. A computer system, comprising:
a cell processor in accordance with claim 6; and
a system memory coupled to the cell processor.

* * * * *